United States Patent
Bries (10) Patent No.: US 12,543,705 B2
(45) Date of Patent: Feb. 10, 2026

(54) ELECTRONIC BODY CALIPER FOR SOWS

(71) Applicant: SwineTech, Inc., Solon, IA (US)

(72) Inventor: Jesse Bries, Newhall, IA (US)

(73) Assignee: SwineTech, Inc., Cedar Rapids, IA (US)

( * ) Notice: Subject to any disclaimer, the term of this patent is extended or adjusted under 35 U.S.C. 154(b) by 365 days.

(21) Appl. No.: 18/327,539

(22) Filed: Jun. 1, 2023

(65) Prior Publication Data
US 2023/0389524 A1 Dec. 7, 2023

Related U.S. Application Data

(60) Provisional application No. 63/349,688, filed on Jun. 7, 2022.

(51) Int. Cl.
| | | |
|---|---|---|
| *A01K 29/00* | (2006.01) | |
| *A61B 5/00* | (2006.01) | |
| *G01B 3/38* | (2006.01) | |

(52) U.S. Cl.
CPC ............. *A01K 29/005* (2013.01); *G01B 3/38* (2013.01); *A01K 29/00* (2013.01); *A61B 5/0053* (2013.01)

(58) Field of Classification Search
CPC .... A01K 29/005; A01K 29/00; A01K 11/006; A01K 67/02; A01K 2267/00; A01K 2267/02; A01K 2227/10; A01K 2227/108; G01B 5/06; G01B 3/20; G01B 3/24; G01B 3/38; G01B 3/166; G01B 3/205; A61D 3/00; A22B 1/00; A61B 5/00; A61B 5/0053; A61B 5/4872

(Continued)

(56) References Cited

U.S. PATENT DOCUMENTS 3,478,435 A 11/1969 Cook
4,127,112 A 11/1978 Sherlock et al.
(Continued)

FOREIGN PATENT DOCUMENTS

AU 2006202079 A1 * 12/2007
AU 2015363812 A1 * 6/2017 ........... A61B 5/1077
(Continued)

OTHER PUBLICATIONS

Knauer, M et al. The Sow Body Condition Caliper. Applied Engineering in Agriculture, vol. 31, No. 2, Mar. 2015, pp. 175-178 [online], [retrieved on Jul. 26, 2025]. Retrieved from the Internet <URL: https://www.researchgate.net/publication/282282592><DOI: 10.13031/aea.31.10632> (Year: 2015).*

(Continued)

*Primary Examiner* — John Fitzgerald
*Assistant Examiner* — Daniel M Quinn
(74) *Attorney, Agent, or Firm* — SHUTTLEWORTH & INGERSOLL, PLC; Jason R. Sytsma (57) ABSTRACT

A first plate with a first downwardly extending member and a second plate with a second downwardly extending member. The second plate moves with respect to the first plate to define a change in a relative angle between the first downwardly extending member and the second downwardly extending member. A position sensor is coupled between the first plate and the second plate to measure a relative change in angle between the first plate and the second plate.

15 Claims, 8 Drawing Sheets

(58) Field of Classification Search
USPC ........... 606/205, 210; 600/587; 33/511, 512, 33/748, 764, 783, 784, 792, 793, 794, 33/798, 799, 800, 801, 807, 808
IPC ........................................................ G01B 5/06
See application file for complete search history.

(56) References Cited

U.S. PATENT DOCUMENTS

| | | | |
|---|---|---|---|
| 4,233,743 A | 11/1980 | Flick | |
| 4,442,606 A * | 4/1984 | Graham | G01B 3/56 33/1 PT |
| 5,163,228 A * | 11/1992 | Edwards | G01B 3/56 33/465 |
| 6,314,654 B1 * | 11/2001 | Morissette | G01B 5/0021 33/794 |
| 6,334,262 B1 * | 1/2002 | Ferrand | B68C 1/00 33/511 |
| 6,829,839 B2 * | 12/2004 | Killough | G01B 3/205 33/511 |
| 10,154,654 B2 * | 12/2018 | Van Der Kamp | G06T 7/60 |
| 10,398,316 B1 * | 9/2019 | Betts-Lacroix | A61B 5/01 |
| 10,822,596 B2 * | 11/2020 | Hatch | C12N 9/16 |
| 10,893,826 B2 * | 1/2021 | Khan | A61B 5/1121 |
| 12,163,779 B2 * | 12/2024 | Hughes | G01B 3/38 |
| 2002/0046471 A1 * | 4/2002 | Skidmore | A61B 5/107 33/511 |
| 2008/0184582 A1 * | 8/2008 | Kim | G01B 3/205 33/784 |
| 2011/0138645 A1 * | 6/2011 | Zhang | G01B 7/12 33/784 |
| 2011/0218391 A1 * | 9/2011 | Signorini | A61B 17/43 600/35 |
| 2012/0275659 A1 * | 11/2012 | Gomas | G06V 10/46 382/110 |
| 2014/0128689 A1 * | 5/2014 | Stewart | A61B 5/4528 600/301 |
| 2016/0042038 A1 * | 2/2016 | Schumacher | G06F 16/2379 707/722 |
| 2016/0135433 A1 * | 5/2016 | Harty | A61B 5/7246 600/595 |
| 2018/0249683 A1 * | 9/2018 | Borchersen | A01K 5/02 |
| 2019/0336041 A1 * | 11/2019 | Geissler | A61B 5/0064 |
| 2021/0386300 A1 * | 12/2021 | Rogers | A61B 5/091 |

FOREIGN PATENT DOCUMENTS

| | | | | |
|---|---|---|---|---|
| BR | 102014004991 A2 * | 10/2018 | ........... | A01K 29/005 |
| CN | 215937361 U * | 3/2022 | | |
| EP | 2370952 B1 * | 9/2014 | ........... | A01K 29/005 |
| WO | WO-2010012433 A1 * | 2/2010 | ........... | A01K 29/00 |
| WO | WO-2017030448 A1 * | 2/2017 | ........... | A01K 29/005 |
| WO | WO-2017217870 A1 * | 12/2017 | ........... | A01J 5/007 |
| WO | WO-2019014670 A1 * | 1/2019 | ........... | B68F 3/00 |
| WO | WO-2019052607 A2 * | 3/2019 | ........... | A61D 13/00 |
| WO | WO-2020071263 A1 * | 4/2020 | ........... | G01B 21/22 |
| WO | WO-2021237144 A1 * | 11/2021 | ........... | A22B 5/0064 |

OTHER PUBLICATIONS

Benjamin, M et al. Precision Livestock Farming in Swine Welfare: A Review for Swine Practitioners. Animals, vol. 9, No. 4:133, Mar. 25, 2019, pp. 1-21 [online], [retrieved on Jul. 26, 2025]. Retrieved from the Internet <URL: https://doi.org/10.3390/ani9040133> <DOI: 10.3390/ani9040133> (Year: 2019).*

Yuhzi, L et al. Evaluation of Sow Caliper for body condition measurement of gestating sows. Journal of Swine Health and Production, vol. 29, No. 5, Oct. 2021, pp. 245-252 [online], [retrieved on Sep. 18, 2025]. Retrieved from the Internet: <URL: https://doi.org/10.54846/jshap/1232> (Year: 2021) <DOI: 10.54846/jshap/1232> (Year: 2021).*

* cited by examiner

ELECTRONIC BODY CALIPER FOR SOWS

CROSS-REFERENCE TO RELATED APPLICATIONS

The present application claims priority to provisional patent application 63/349,688 which was filed on Jun. 7, 2022 and is hereby expressly incorporated by reference in its entirety.

TECHNICAL FIELD

This invention relates generally to body calipers for sows, and more specifically, to an electronic body caliper for display and storage of body fat composition information.

BACKGROUND INFORMATION

Pork is the most consumed meat in the world. In the United States, it is a $23 billion industry with more than 60,000 pork producers. In the U.S. most pigs are raised by producers with over 5,000 swine and most are owned by firms that each own over 50,000 swine.

The typical hog production cycle lasts about 4 years. This is a function of the pig biological cycle, which consists of four basic phases: (1) breeding and gestation, (2) farrowing, (3) feeding, and (4) finishing. During these phases, pigs are raised in confinement buildings where environmental conditions can be carefully managed. The pigs are carefully maneuvered from location to location following each phase, keeping them separate from other pigs.

During the gestation phase, the health of sows is carefully monitored. Feed input is critically important for both managing costs and for animal well-being. If the sow gets too thin, her health decreases. Similarly, if the sow gets too fat, her health decreases and feed costs increase. For this reason, it is important to ensure the sow maintains an optimal body composition.

Figure 1:
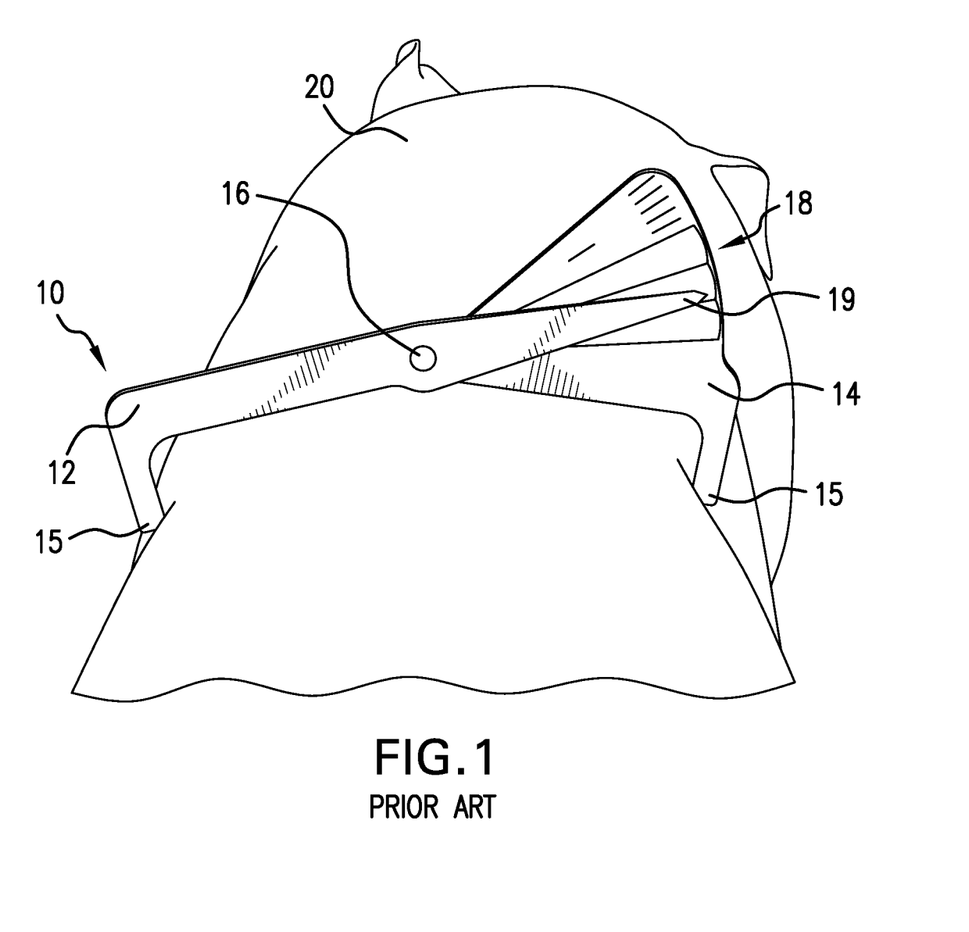
FIG. 1 shows a body caliper for a sow of the prior art.

A caliper was developed to objectively measure the sow's body condition. It works by measuring the angle of the sow's back at the last rib. Referring to FIG. 1, there is shown a body caliper 10 for a sow 20 of the prior art. There are two arms 12, 14 that each have a downwardly projecting member 15 for precise placement at the last rib of sow 20. Two arms 12, 14 are pinned together at a pivot point 16 for relative movement with respect to each other. One of the arms 14 can have a measurement plate 18 labeled with three zones, thin, ideal, and fat, for example, to provide a display indicating the body condition of sow 20. The second plate comprises a pointer 19. When the body caliper 10 is placed in the correct position along the backbone at the last rib, the pointer 19 will point at one of the three zones on measurement plate 18 to provide an objective measurement of the body condition of sow 20.

While the body caliper 10 works great, large scale operations have difficulty recording and storing these measurements. Also, the scale with three zones is a crude measurement that could be improved upon with greater accuracy. Accordingly, there is a need for an electronic body caliper that measures, records, and stores body condition of a sow 20.

SUMMARY OF THE INVENTION

Disclosed is an electronic body caliper for animals. The body caliper can comprise a first plate with a first downwardly extending member and a second plate with a second downwardly extending member. The second plate moves with respect to the first plate to define a change in a relative angle between the first downwardly extending member and the second downwardly extending member. A position sensor is coupled between the first plate and the second plate to measure a relative change in angle between the first plate and the second plate.

In an embodiment, a computing device is provided in communication with the position sensor to receive signals therefrom and to translate the relative change in position between the first plate and the second plate to a value corresponding to one of a set of values representing a body condition for the animal. A lookup table is accessible by the computing device to translate the relative change in position between the first plate and the second plate to the value corresponding to one of the set of values representing a body condition for the animal. In an embodiment, a plurality of lookup tables corresponding to a plurality of scales that correspond to the body condition for one animal of a plurality of animals can be provided. The computing device is reconfigurable with any one of the plurality of lookup tables.

In an embodiment, the electronic body caliper can comprise one or more signal filtering and conditioning components connected to the position sensor to receive the signals from the position sensor and adjust the signals. An analog to digital converter ("ADC") can be connected to the one or more signal filtering and conditioning components which converts the input signal to digital form. Alternatively, the position sensor can be one that outputs a digital signal so that the ADC is not required.

In another embodiment, a microcontroller is connected to the position sensor to receive the signals from the position sensor and to translate the relative change in position between the first plate and the second plate to a value corresponding to one of a set of values representing a body condition for the animal. The microcontroller can further comprise a lookup table accessible by the microcontroller to translate the relative change in position between the first plate and the second plate to the value corresponding to one of the set of values representing a body condition for the animal. Furthermore, the microcontroller can comprise a plurality of lookup tables corresponding to a plurality of scales that correspond to the body condition for one animal of a plurality of animals wherein the microcontroller is reconfigurable with any one of the plurality of lookup tables. A further embodiment can comprise a computing device in communication with the microcontroller to receive the body condition for the animal. The lookup table(s) can be stored on the microcontroller or on the computing device or both.

In another embodiment, a method for determining a body condition of an animal is disclosed. The method comprises creating a lookup table to translate a set of values to the body condition of the animal. The method continues with measuring the body condition of the animal with a mechanical body caliper. The method continues with translating the measurement of the body condition of the animal to a numerical value. The method continues with comparing the numerical value to the set of values in the lookup table. The method further continues with outputting the body condition of the animal. In an embodiment, the method can comprise creating a plurality of lookup tables each of which translates a set of values to the body condition of the animal.

In yet another embodiment, the method comprises converting an analog measurement signal to a digital measurement signal with a predefined range and resolution and mapping the value to the set of values in the lookup table.

The method can comprise translating the digital measurement signal to the body condition of the animal. The method can further comprise transmitting the value of the set of values corresponding to the body condition of the animal to a computing device.

In yet another embodiment, the method comprises providing a position sensor coupled to the mechanical body caliper and providing a microcontroller connected to the position sensor to receive the signals from the position sensor and to translate the measurement of the body condition of the animal to the numerical value and to compare the numerical value to the set of values in the lookup table, and to output the body condition of the animal.

DETAILED DESCRIPTION OF THE PREFERRED EMBODIMENTS

Figure 2:
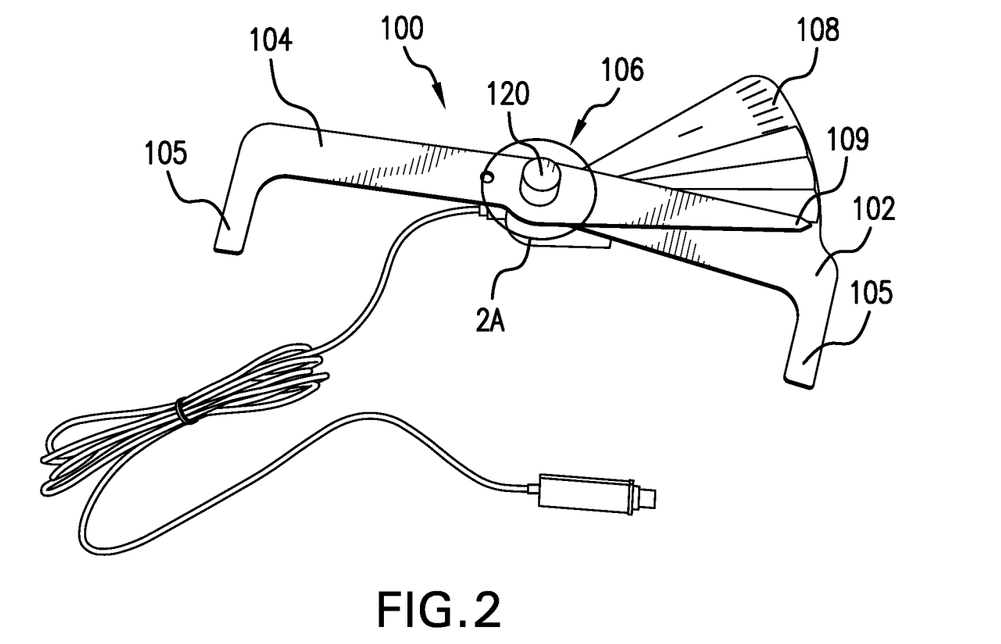
FIG. 2 shows a front-side of a body caliper according to this disclosure.
Figure 3:
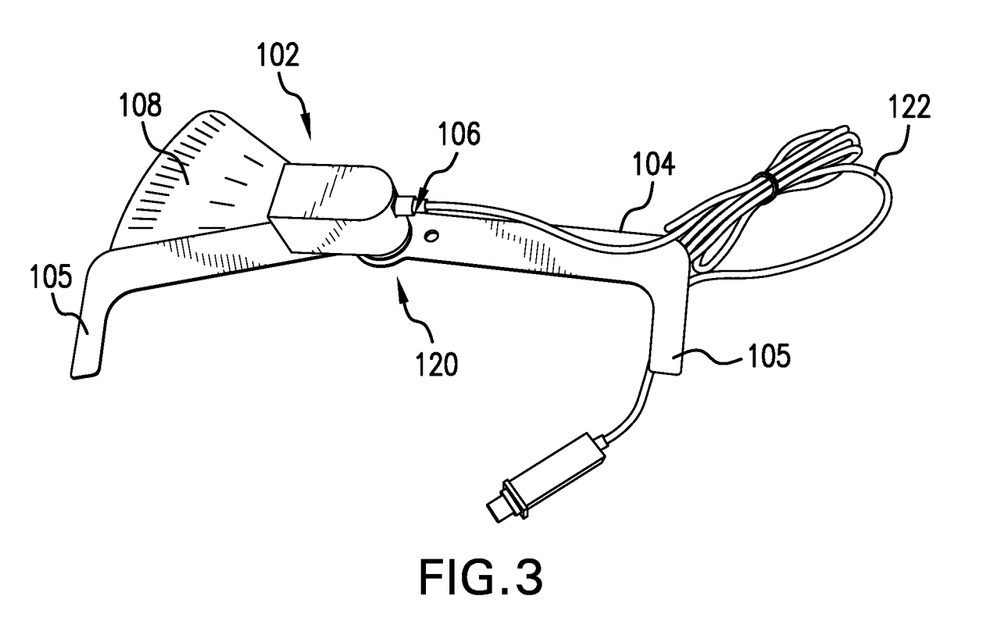
FIG. 3 shows a back-side of the body caliper of FIG. 2.

FIGS. 2 and 3 show a body caliper 100 according to this disclosure. Body caliper 100 allows the measurement of a body condition of a sow 20 to be electronically communicated to a computing device for processing, display, storage and/or re-transmission. This electronic body caliper 100 results in increased efficiency by removing the task of manually reading/recording the measurement and tying the measurement directly to an animal in data capture software. Also, the body caliper 100 provides flexibility to adjust or tune the body condition scale for specific needs, such as animal genetics, parity, age, or prior performance, therefore allowing a single device to serve as multiple calipers.

When taking a measurement, the components of body caliper 100 are positioned in a manner that indicates the body condition score (numerical and/or categorical). With a mechanical caliper, the body condition score is indicated on a built-in "gauge." The translation of the measurement to the gauge occurs via a pivot point that joins components of body caliper 100. It is the physical orientation of these components that can be measured and converted into the digital domain through an electronic circuit.

More specifically, body caliper 100 comprises a first plate 102 and a second plate 104 that each have a downwardly projecting member 105 for precise placement at the last rib of sow 20. First plate 102 and second plate 104 are pinned together at a pivot 106 for relative movement with respect to each other. First plate 102 can have a measurement plate 108 or built-in gauges labeled with three zones, thin, ideal, and fat, or specific measurement indices, for example, to provide a display indicating the body condition of sow 20. Instead, a digital display (e.g. Liquid Crystal Display) could be provided to indicate the zones or measurement indices or the measurement plate or gauges can be removed entirely with the measurement being transmitted, as described below. Second plate can comprise a pointer 109 in embodiments with measurement plate 108. When the body caliper 100 is placed in the correct position along the backbone at the last rib, the pointer 109 will point at one of the three zones, or other measurement indices, on measurement plate 108 to provide an objective measurement of the body condition of sow 20. Similarly, pointer 109 can be shown on a digital display or removed entirely with the measurement being transmitted, as described below.

Figure 6:
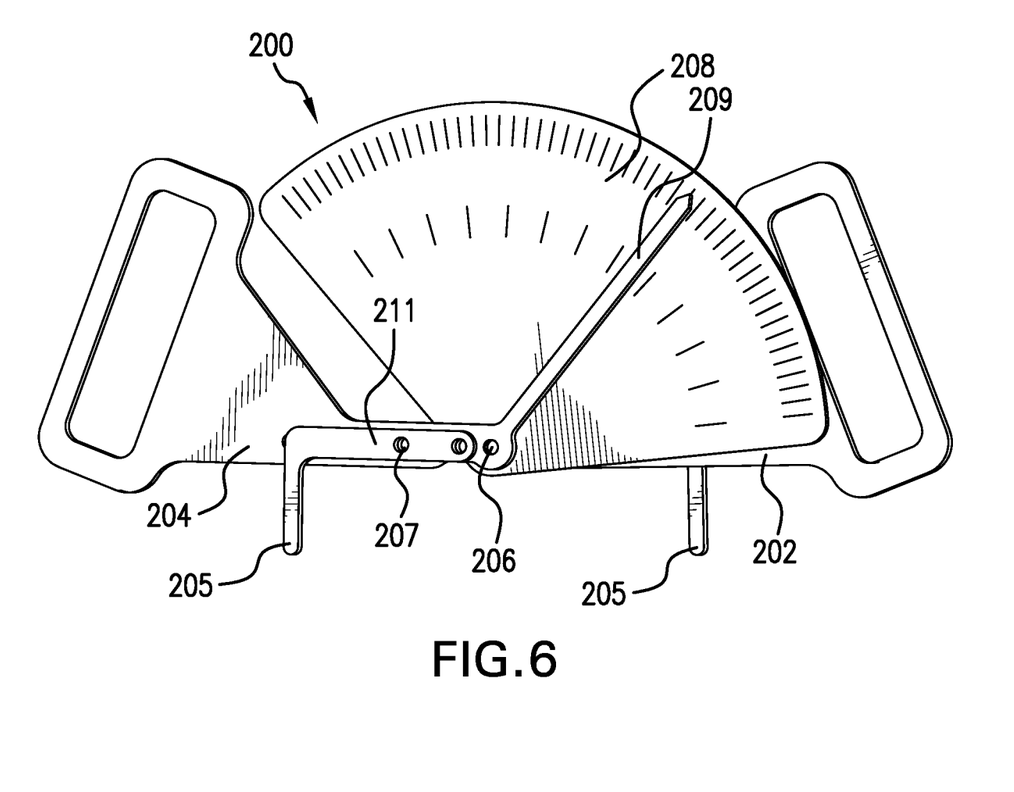
FIG. 6 shows an alternative embodiment of a body caliper.

Another embodiment of a body caliper 200 is shown in FIG. 6. Body caliper 200 comprises a first plate 208 (with attached handle 202) and a second plate 204 that each have a downwardly projecting member 205 for precise placement at the last rib of sow 20. First plate 208 and second plate 204 are pinned together at a pivot point 206 for relative movement with respect to each other. First plate 208 can have a measurement indicator labeled with three zones, thin, ideal, and fat, or specific measurement indices, for example, to provide a display indicating the body condition of sow 20. Second plate comprises a pointer 209. When the body caliper 200 is placed in the correct position along the backbone at the last rib, the pointer 209 will point at one of the three zones, or other measurement indices, on first plate 208 to provide an objective measurement of the body condition of sow 20. In this embodiment, a third plate 211 containing one of downwardly projecting members 205 can be used with a second hole 207 for gross adjustment of the width between two downwardly projecting members 205 and a fourth plate, similar to third plate 211, can be used that comprises the rear downwardly projecting member 205 and one or more adjustment holes. Pivot point 206 can be removed and adjusted into second hole 207 to provide a more narrow range of width. It should be further noted that body caliper 100 and 200 can be modified to have more adjustment pieces without departing from the scope of this invention. Furthermore, since the electronics for body caliper 100 and body caliper 200 are the same, the following disclosure is directed to body caliper 100 with the understanding that the electronics in body caliper 200 are the same.

Figure 2A:
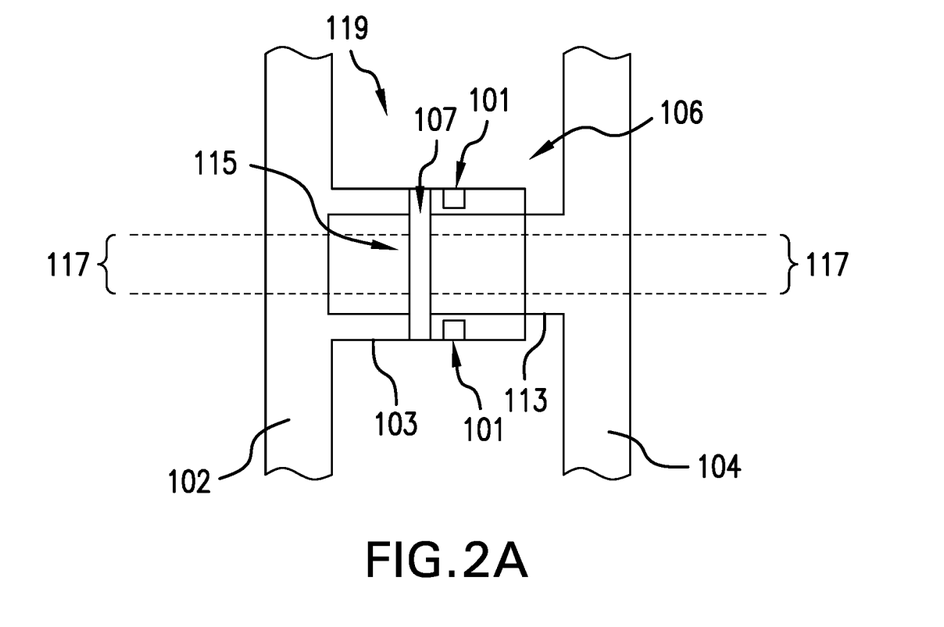
FIG. 2A shows a close-up cross-sectional view of area 2A of the pivot point of the body caliper of FIG. 2.

FIG. 2A shows a close-up cross-sectional view of area 2A of the pivot 106 of the body caliper of FIG. 2. As discussed below a position sensor 120 translates relative movement of first plate 102 with respect to second plate 104 and can be positioned in pivot 106. It may be desirable to have an independent mechanism serve as the physical attachment point in pivot 106 to take the load off of position sensor 120 so that its measurement is not skewed by the stresses in pivot 106 during use. A load coupling 119 can be provided to attach first plate 102 to second plate 104. First plate 102 can comprise a tubular protrusion 103. Tubular protrusion 103 may be attached to first plate 102 by various mechanical methods (threads, welding, adhesive, etc.), depending on the materials used, or it may be formed as part of the plate itself. Inside tubular protrusion 103 is an inwardly protruding catch 101, which can be implemented as a ring or protrusion extending 360 degrees around an inside wall of tubular protrusion 103. As will be described, catch 101 receives a retention ring 107.

Second plate 104 comprises a second tubular protrusion 113 similarly attached to second plate 104 by various mechanical methods (threads, welding, adhesive, etc.), depending on the materials used, or formed as part of second plate 104 itself. Second tubular protrusion 113 can comprise a groove 115 that is 360 degrees therearound to receive retention ring 107. Second tubular protrusion 113 fits inside tubular protrusion 103 of first plate 102 with retention ring 107 flexing into groove 115 as it slides through catch 101 and then expanding after in position to lock second plate 104 and first plate 102 together.

With second plate 104 and first plate 102 locked together, a cylindrical path 117 therebetween is provided to receive position sensor 120. In embodiments where position sensor 120 is a potentiometer, the shaft connected to the wiper can be placed in cylindrical path 117. Those skilled in the art will recognize that various other types of connection mechanisms for pivot 106 can be provided that will take the load off of position sensor 120.

The relative position of first plate 102 with respect to second plate 104 is measured by position sensor 120 that translates relative movement of first plate 102 with respect to second plate 104 to an electronic signal that can be wired (via cable 122) or wirelessly transmitted to a computing device 128a. The output from position sensor 120 could be an analog or digital signal. An ADC (analog to digital converter) can be used to convert an analog signal to the digital domain. A digital representation of the measurement of position sensor 120 (i.e. the position of the caliper's plates with respect to one another) can be represented by an integer value of 0 to 1023, for example. One skilled in the art would understand that this range does not need to be 0-1023, but rather it is simply a result of one implementation having an ADC with 10-bit resolution (2^10=1024). Designs with different ADCs and/or sensors (e.g., digital sensors) can vary in their output. The chosen position sensor 120 must have an operational range no smaller than the range of valid measurements for body caliper 100 (i.e., the scale or gauge on a mechanical caliper). It is likely that the chosen position sensor 120 will have a larger range than what is actually needed.

To illustrate the translation of such a digital value to a body condition score, assume that the overall range of a three-point body condition scale (thin, ideal, and fat ranges) maps to the values from 250 to 774 (in the range of 0-1023 described above) and changes in these values correspond linearly to changes in measurements of position sensor 120. This may not necessarily be the case in practice as different position sensors have different characteristics (e.g. logarithmic potentiometers). It can also be possible to have different ranges. Table 1, below, shows how these values can be mapped to a result on a three-point scale. While Table 1 shows the three results (subranges) as equal, this also does not necessarily have to be the case in practice.

TABLE 1

| Value from Electronics | 3-point Scale |
|---|---|
| 250-424 | Thin |
| 425-599 | Ideal |
| 600-774 | Fat |

If, on the other hand, the operator determines a 5-point scale is needed, a new selection can be made in the software application. Similarly, assuming a range of 250 to 779 for a five-point scale, Table 2 below, shows how these values can map to a result on a 5-point scale, for example.

TABLE 2

| Value from Electronics | |
|---|---|
| Value from Electronics | 5-point Scale |
| 250-355 | 1 |
| 356-461 | 2 |
| 462-567 | 3 |
| 568-673 | 4 |
| 674-779 | 5 |

One skilled in the art will recognize that the scale can be changed in software to any set of values to correspond to the output range of position sensor 120 or an ADC. Within the software of computing device 128a, lookup tables with any scale (range, subranges and/or resolution) can be stored and easily referenced by the operator to change the mapping of input (values) to output (result). The desired scale can be selected by a user or automatically, by the software, based on predetermined criteria. Based on this selection, the software application in computing device 128a is able to determine how the input value from position sensor 120 or an ADC should map to an output (body condition score). The body condition score can be customized for any specific need, for example genetics, parity, age, or prior performance.

Figure 7:
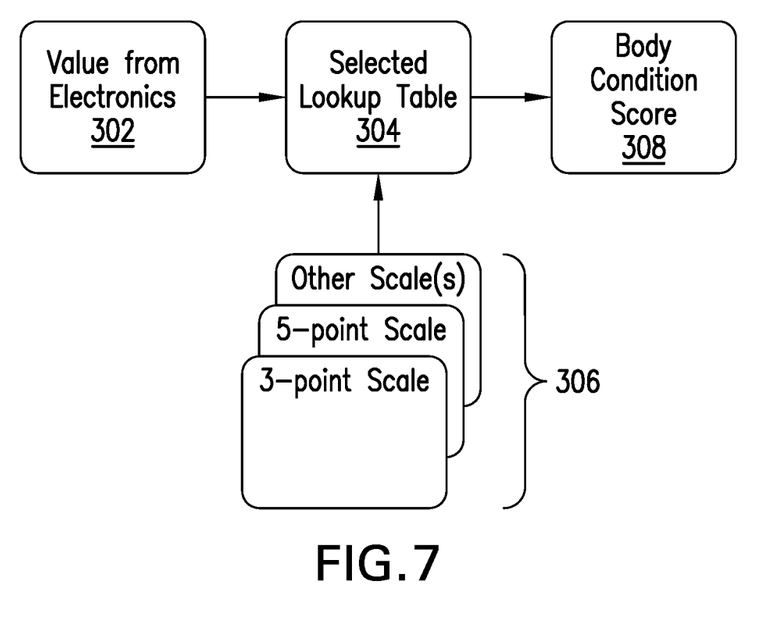
FIG. 7 is a block diagram of the translation of a position sensor measurement to a body condition score for various scales that are software configurable.

With reference to FIG. 7, shown is a flow diagram of software residing in computing device 128a showing how output 302 from position sensor 120 or an ADC is mapped, via a lookup table 304, that can be configured to translate the sensor or ADC output to a body condition score 308 based on any one of a plurality of stored lookup tables 306.

Figure 4:
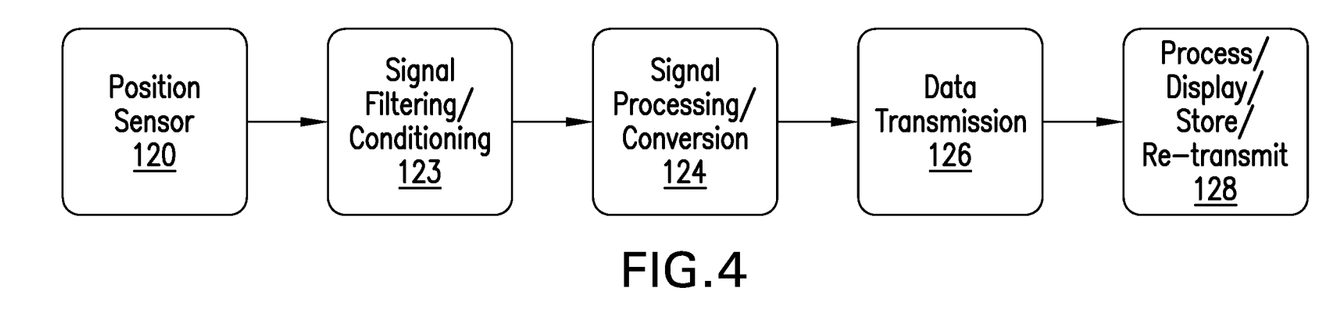
FIG. 4 is a block diagram of the signal conditioning, processing, and flow in a body caliper according to this disclosure.

Turning to FIG. 4, shown is a block diagram of the signal conditioning, processing, and flow in body caliper 100 according to this disclosure. Position sensor 120 translates relative movement of first plate 102 with respect to second plate 104 to an electronic signal. The electronic signal is then filtered and conditioned, for further processing, by appropriate signal filtering and conditioning components 123. Next, the filtered and conditioned signal is converted from an analog signal to a digital signal, if needed, by a signal processing and conversion stage. Additional signal processing can also be performed in this stage. The digital signal representative of the body fat composition of sow 20 is then transmitted by data transmission components 126 either wired (via cable 122) or wirelessly to a computing device 128a.

More specifically, position sensor 120 can comprise a linear position sensor, a rotary position sensor, or an angular position sensor each of which can be implemented as a resistance-based sensor, an inductive sensor, an Eddy Current-Based sensor, a capacitive sensor, a magnetostrictive sensor, a rotary encoder, Hall Effect-Based magnetic position sensor, a fiber optic position sensor, an optical position sensor, or an ultrasonic position sensor. No matter the type of position sensor 120, a changing voltage or current based on relative position of first plate 102 with respect to second plate 104 is provided to signal filtering and conditioning components 123. With respect to FIG. 5, position sensor 120 can be implemented as resistance based position sensor, such as a potentiometer 120a. Using potentiometer 120a has an added advantage of having a built in pivot point to correspond with pivot 106. First plate 102 is attached to the base of potentiometer 120a and second plate 104 is connected to the shaft of potentiometer 120a. As second plate 104 is pivoted with respect to first plate 102 the relative position of the wiper with respect to the track of potentiometer 120a changes, resulting in changing internal resistances that form a voltage divider. This internal voltage divider is varied by the wiper moving relative to a track having a fixed voltage across it. The voltage on the wiper terminal corresponds to a precise relative position of second plate 104 with respect to first plate 102.

Figure 5:
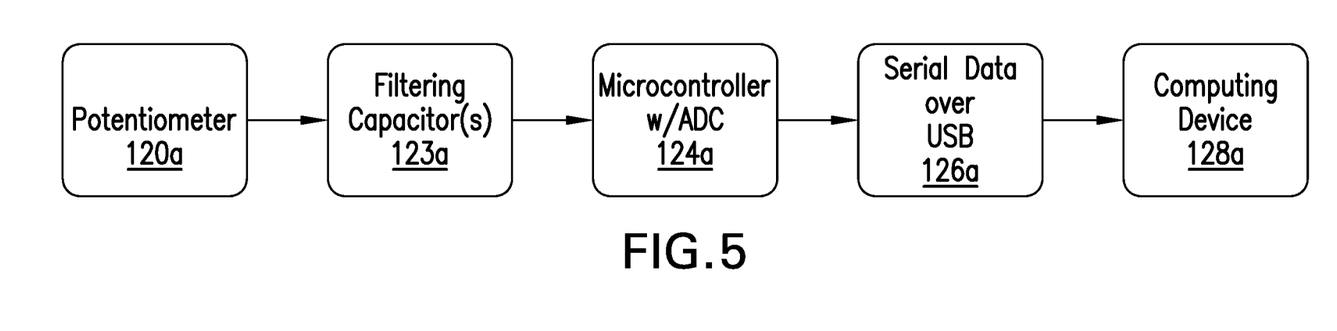
FIG. 5 is a block diagram of a more specific implementation of the signal conditioning, processing, and flow in the body caliper of FIG. 2.

Signal filtering and conditioning components 123 remove or filter out noise from the measurement signal, adjust the gain, offset, or impedance, for example to raise the floor of the measurement signal, or make other adjustments to the signal. Signal filtering and conditioning components 123 is optional and dependent upon the implementation of position sensor 120 and associated circuitry.

In one implementation, filtering capacitors 123*a* can be used to remove noise and smooth the output of position sensor 120 to provide a more stable voltage to the signal processing/conversion block 124. In the event that position sensor 120 outputs a digital signal, signal filtering and conditioning components 123 can be used to modify or adjust the digital signal. For analog signals, signal conversion can be carried out by an ADC, alone or in a package with a microcontroller 124*a*. The ADC samples the incoming measurement signal and converts the signal level to a corresponding digital value. The digital signal, whether produced by the ADC or directly received from a digital sensor, can be further processed as needed. Subsequent processing can be performed by microcontroller 124*a* or by a computing device 128*a* with an appropriate interface to microcontroller 124*a* or a digital sensor.

Once a digital representation of the caliper's measurement is obtained, it can be passed to either microcontroller 124*a* or computing device 128*a*. In an embodiment, microcontroller 124*a* comprises circuitry 126*a* for serial data transmission over USB connection to a computing device 128*a*, such as a computer, smartphone, tablet, etc. Alternatively, computing device 128*a* can process, display, store and/or re-transmit the measurement signal as necessary. Software can be used to capture the measurement at an instance in time. This can be performed via a button on the user interface of a software application or by interfacing a physical button or other type of trigger, on body caliper 100, with microcontroller 124*a* or computing device 128*a*. Software can also be used to map measurement values to various scales (e.g. body condition score on a three or five point scale, different measurement-to-result mappings for various animal genetics, parity, age, or prior performance) as desired by the end-user. It should also be noted that software mapping could also be performed by microcontroller 124*a* before transmission to computing device 128*a*. Having microcontroller 124*a* perform the lookup table translation would be desired if body caliper 100 comprised an electronic display in lieu of (or in conjunction with) transmitting the data to computing device 128*a*.

Power can be provided from a computing device (e.g. a smartphone USB port), battery or other capable source, to provide the electronic circuitry with operational power. This power source (or a power supply derived from this source) can be used to provide a reference voltage for the internal voltage divider of potentiometer 120*a*. The variable voltage divider changes based on the position of the potentiometer wiper, as described above. In an embodiment, this output voltage can feed into an ADC pin of microcontroller 124*a* where the analog signal voltage (e.g., 0-3.3 VDC) is converted to a 10-bit digital representation (e.g., numeric values 0-1023). This value is then sent via communication interface (virtual COM port via USB) over a USB cable to the USB port of computing device 128*a*. Computing device 128*a* with specialized software applications can then display, store and/or upload the measurement data to a remote application operating in the "cloud" where the data can be stored and viewed remotely.

Figure 8:
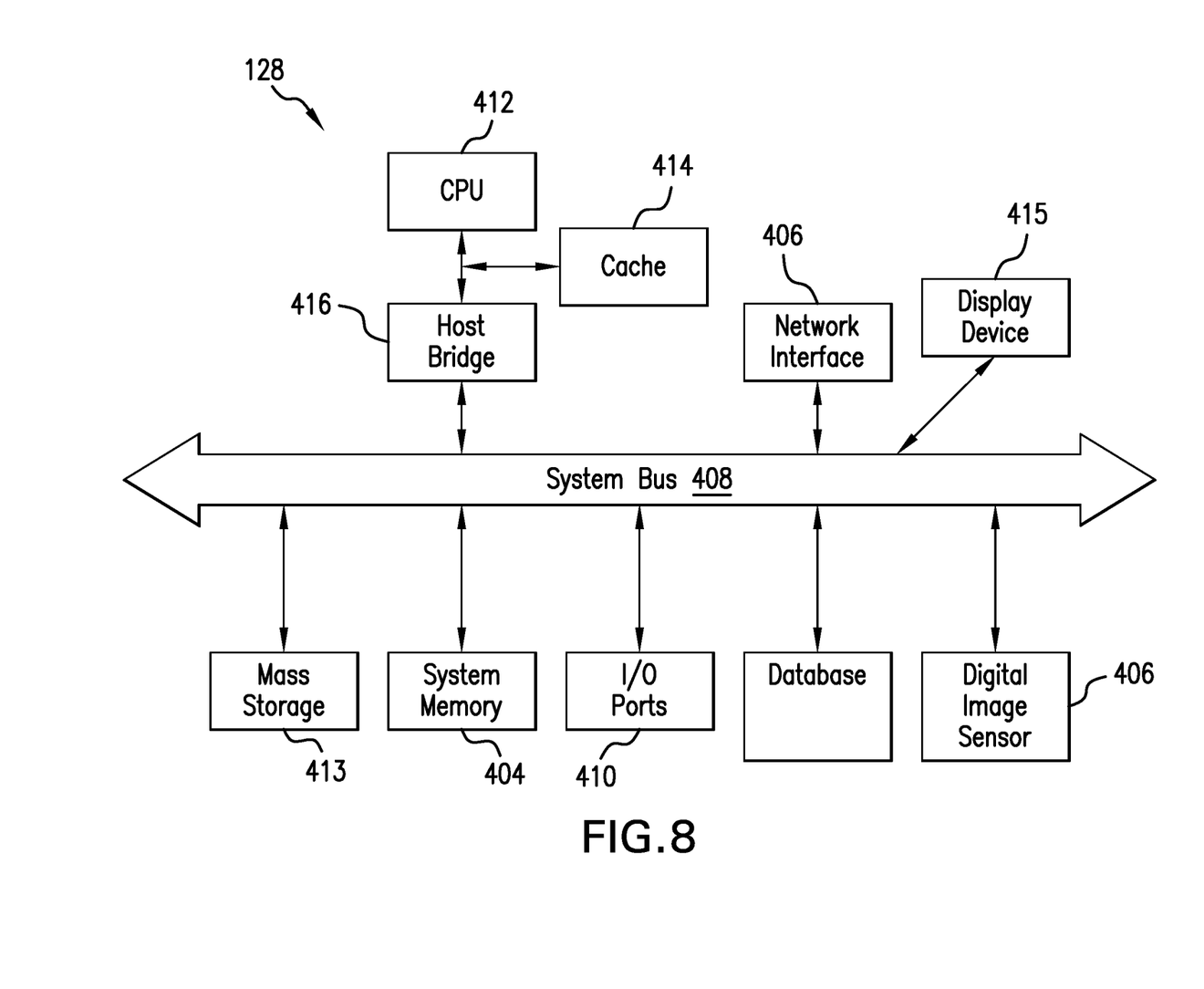
FIG. 8 shows an exemplary computing platform

FIG. 8 shows an exemplary computing platform for executing the processing function necessary to derive, calculate, and perform the above functions that are described as being carried out on computing device 128*a*. In one implementation, computing device 128*a* comprises a system memory 404, network interface 406 and one or more software applications and drivers enabling or implementing the methods and functions described herein. Hardware system includes a system bus 408 with I/O Ports 410 and mass storage 413 (which can also be a non-volatile Flash Memory) coupled thereto or external or cloud-based storage, such as Google or Amazon cloud services. Bridge 416 couples processor(s) 412 to system bus 408. The hardware system may further include video memory and display device 415 coupled to the video memory. These elements are intended to represent a broad category of computer hardware systems, including but not limited to general-purpose computer systems based on the Pentium processor manufactured by Intel Corporation of Santa Clara, Calif., as well as any other suitable processor.

Elements of the computer hardware system perform their conventional functions known in the art. In particular, network interface 406 is used to provide communication between computing device 128*a* and Ethernet networks (or any other network or external device). Mass storage 413 can be provided and used to provide permanent storage for the data and programming instructions to perform the above-described functions, whereas system memory 404 (e.g., DRAM) is used to provide temporary storage for the data and programming instructions when executed by processor(s) 412. I/O ports 410 are one or more serial and/or parallel communication ports used to provide communication between additional peripheral devices, including microcontroller 124*a*. Additionally, I/O ports 410 could be one or more discrete I/O (e.g. GPIO) to interface with external electronic circuitry.

Computing system 128*a* may include a variety of system architectures, and various components of processor(s) 412 may be rearranged. For example, cache 414 may be on-chip with processor(s) 412. Alternatively, cache 414 and processor(s) 412 may be packed together as a "processor module," with processor(s) 412 being referred to as the "processor core." Furthermore, certain implementations of the claimed embodiments may not require nor include all the above components. Also, additional components may be included, such as additional processors, storage devices, or memories.

Microcontroller 124*a* can also have implemented therein one or more of the signal processing components illustrated in FIGS. 4 and 5 and have stored therein lookup tables 306 and selected lookup table 304. The signal processing/conversion block 124 can be implemented with a variety of circuitry including programmable logic devices (PLDs), such as field programmable gate arrays (FPGAs), programmable array logic (PAL) devices, electrically programmable logic and memory devices and standard cell-based devices, as well as application specific integrated circuits (ASICs), all of which can be considered as the signal processing/conversion block 124. Some other possibilities for implementing aspects of the systems and methods disclosed herein include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. An electronic body caliper for animals, comprising: a first plate comprising a first downwardly extending member a second plate comprising a second downwardly extending member, wherein the second plate moves with respect to the first plate corresponding to a change in a relative angle between the first downwardly extending member and the second downwardly extending member; a position sensor coupled between the first plate and the second plate to measure a relative change in angle between the first plate and the second plate; a computing device in communication with the position sensor to receive signals therefrom and to translate the relative change in position between the first plate and the second plate to a value corresponding to one of a set of values representing a body condition for the animal; and wherein the set of values are arranged into one of three ranges corresponding to "thin", "ideal", and "fat" for the body condition of the animal.

2. The electronic body caliper of claim 1, further comprising a lookup table accessible by the computing device to translate the relative change in position between the first plate and the second plate to the value corresponding to one of the set of values representing a body condition for the animal.

3. The electronic body caliper of claim 2, further comprising a plurality of lookup tables corresponding to a plurality of scales that correspond to the body condition for one animal of a plurality of animals wherein the computing device is reconfigurable with any one of the plurality of lookup tables.

4. The electronic body caliper of claim 1, further comprising one or more signal filtering and conditioning components connected to the position sensor to receive the signals from the position sensor and adjust the signals.

5. The electronic body caliper of claim 4, further comprising an analog to digital converter (ADC) connected to the one or more signal filtering and conditioning components which converts an input signal to digital form.

6. The electronic body caliper of claim 1, further comprising a microcontroller connected to the position sensor to receive signals from the position sensor and to translate the relative change in position between the first plate and the second plate to a value corresponding to one of a set of values representing a body condition for the animal.

7. The electronic body caliper of claim 6, wherein the microcontroller further comprises a lookup table accessible by the microcontroller to translate the relative change in position between the first plate and the second plate to the value corresponding to one of the set of values representing a body condition for the animal.

8. The electronic body caliper of claim 7, wherein the microcontroller further comprises a plurality of lookup tables corresponding to a plurality of scales that correspond to the body condition for one animal of a plurality of animals wherein the microcontroller is reconfigurable with any one of the plurality of lookup tables.

9. The electronic body caliper of claim 6, further comprising a computing device in communication with the microcontroller to receive the body condition for the animal.

10. A method for determining a body condition of an animal, the method comprising: creating a lookup table to translate a set of values to the body condition of the animal; measuring the body condition of the animal with a mechanical body caliper; translating the measurement of the body condition of the animal to a numerical value; comparing the numerical value to the set of values in the lookup table wherein the set of values are arranged into one of three ranges corresponding to "thin", "ideal", and "fat" for the body condition of the animal; outputting one of the "thin", "ideal", and "fat" for the body condition of the animal; and converting an analog measurement signal to a digital measurement signal with a predefined range and resolution corresponding to the set of values in the lookup table and mapping the numerical value to the set of values in the lookup table.

11. The method for determining the body condition of the animal of claim 10, further comprising creating a plurality of lookup tables each of which translates a set of values to the body condition of the animal.

12. The method for determining the body condition of the animal of claim 10, further comprising translating the digital measurement signal to the measurement of the body condition of the animal.

13. The method for determining the body condition of the animal of claim 12, further comprising transmitting the value of the set of values corresponding to the body condition of the animal to a computing device.

14. The method for determining the body condition of the animal of claim 13, wherein the computing device is in communication with a database that associates the body condition of the animal with a specific animal.

15. The method for determining the body condition of the animal of claim 10, further comprising:
   providing a position sensor coupled to the mechanical body caliper; and
   providing a microcontroller connected to the position sensor to receive signals from the position sensor and to translate the measurement of the body condition of the animal to the numerical value and to compare the numerical value to the set of values in the lookup table, and to output the body condition of the animal.

\* \* \* \* \*